(12) United States Patent
Braghiroli et al.

(10) Patent No.: US 8,342,222 B2
(45) Date of Patent: Jan. 1, 2013

(54) METHOD FOR MOUNTING A TYRE ON A RIM TO FORM A MOTOR VEHICLE WHEEL AND FOR DEMOUNTING A TYRE FROM A RIM AND APPARATUS THEREFORE

(75) Inventors: Francesco Braghiroli, Reggio Emilia (IT); Paolo Sotgiu, Modena (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 0 days.

(21) Appl. No.: 12/959,087

(22) Filed: Dec. 2, 2010

(65) Prior Publication Data
US 2011/0174446 A1 Jul. 21, 2011

(30) Foreign Application Priority Data
Jan. 20, 2010 (EP) .................................... 10000545

(51) Int. Cl.
*B60C 25/00* (2006.01)
(52) U.S. Cl. ........................................................ 157/1.1
(58) Field of Classification Search ............... 157/1, 1.1, 157/1.24, 1.28, 1.17; 356/139.09, 155
See application file for complete search history.

(56) References Cited

U.S. PATENT DOCUMENTS

| | | | |
|---|---|---|---|
| 3,877,505 A | | 4/1975 | Besuden et al. |
| 5,238,041 A | * | 8/1993 | Tomita et al. ................... 157/13 |
| 6,527,032 B2 | * | 3/2003 | Corghi ......................... 157/1.28 |
| 7,089,987 B2 | * | 8/2006 | Gonzaga ....................... 157/1.24 |
| 7,199,873 B2 | * | 4/2007 | Braghiroli ................. 356/139.09 |
| 7,495,755 B2 | * | 2/2009 | Voeller et al. ............. 356/139.09 |
| 7,768,632 B2 | * | 8/2010 | Sotgiu ....................... 356/139.09 |
| 2004/0165180 A1 | | 8/2004 | Voeller et al. |
| 2009/0266494 A1 | * | 10/2009 | Sotgiu .......................... 157/1.24 |
| 2010/0108271 A1 | * | 5/2010 | Matteucci ..................... 157/1.24 |

FOREIGN PATENT DOCUMENTS

| | | |
|---|---|---|
| EP | 1 927 484 A1 | 6/2008 |
| EP | 1 995 083 A1 | 11/2008 |
| EP | 2 110 270 A1 | 10/2009 |

OTHER PUBLICATIONS

European Search Report issued in European Patent Application No. 10000545.3-2425, mailed Jun. 29, 2010.

* cited by examiner

*Primary Examiner* — Hadi Shakeri
(74) *Attorney, Agent, or Firm* — McDermott Will & Emery LLP

(57) ABSTRACT

The invention concerns a method and apparatus for mounting a tire on a rim to form a motor vehicle wheel and for demounting a tire from a rim with at least one fitting or removal tool. Images of the wheel (14) or the rim (12) are created by a vision system (21) and corresponding signals are sent to a computer (18, 28). Commands to move the at least one fitting or removal tool (16) are sent to the at least one fitting or removal tool (16) by the computer (18, 30), the signals of the vision system (21) and the commands sent to the at least one fitting or removal tool (16) are correlated to define the position of the at least one fitting or removal tool relative to the rim contour, and the movement of the at least one fitting or removal tool (16) is guided in dependence on the performed correlation without contacting the rim surface.

12 Claims, 3 Drawing Sheets

METHOD FOR MOUNTING A TYRE ON A RIM TO FORM A MOTOR VEHICLE WHEEL AND FOR DEMOUNTING A TYRE FROM A RIM AND APPARATUS THEREFORE

FIELD OF DISCLOSURE

The invention concerns a method for mounting a tyre on a rim to form a motor vehicle wheel and for demounting a tyre from a rim. Furthermore, the invention concerns an apparatus for mounting a tyre on a rim to form a motor vehicle wheel and for demounting a tyre from a rim.

BACKGROUND

An apparatus which is known from U.S. Pat. No. 3,877,505 has a receiving device to which the rim of a motor vehicle wheel can be fixed. The receiving device can be rotated during the fitting or removal operation by means of a rotary drive device, for example an electric motor. The tyre can be fitted to the rim or released from the rim by means of fitting or removal tools. Provided on the removal tool is a sensing device in the form of a projection which senses the radial outside surface (rim bed) of the rim and which comprises a material which does not damage the rim material, for example plastic material. That ensures that the removal tool is kept at a given spacing from the surface of the rim in the removal operation. That prevents the rim surface being damaged by the hard material of the removal tool. In that case however there is the danger that the projection which senses the rim contour and which maintains the spacing wears away due to abrasion or is damaged in some other fashion.

It is also known from EP 1 995 083 to sense the position of the rim contour along which the fitting or removal tool is guided in a contact-less manner. Afterwards, the movement of the fitting or removal tool is guided in dependence on the sensed contour without contacting the rim surface.

EP 1 927 484 shows a sensing device for contact-less sensing. Thereby, the sensing device is preferably based on the principle of optical laser triangulation. The sensing device provides a light source that emits a light beam onto the surface in one or more given positions and intersects the rim surface in a plurality of impingement points. At each of the impingement points, the light beam is scattered in a plurality of light rays that are reflected. These reflected light beams were detected by a detector. The spacings and thus the positions of the impingement points sensed at the wheel or the rim can be determined in dependence on the directions of the emitted and reflected light beams by triangulation. The sensed points are detected in a three-dimensional manner and the coordinates of the sensed points (X, Y and Z values) are known.

SUMMARY

The problem of the present invention is to provide a method for mounting a tyre on a rim to form a motor vehicle wheel and for demounting a tyre from a rim and an apparatus therefore, with which at least one fitting or removal tool can be reliably guided along a rim contour of the wheel and in particular the fitting or removal of the tyre is performed in such a way as to protect the rim of the vehicle wheel during the fitting or removal operation.

This is achieved with a method for mounting a tyre on a rim to form a motor vehicle wheel and for demounting a tyre from a rim with at least one fitting or removal tool, wherein images of the wheel or the rim are created by a vision system and corresponding signals are sent to a computer, wherein commands to move the at least one fitting or removal tool are sent to the at least one fitting or removal tool by the computer, wherein the signals of the vision system and the at least one command sent to the at least one fitting or removal tool are correlated to define the position of the at least one fitting or removal tool relative to the rim contour and wherein the movement of the at least one fitting or removal tool is guided in dependence on the performed correlation without contacting the rim surface. According to the invention, the signals corresponding to the created images by the vision system and the at least one command sent to the at least one fitting or removal tool are correlated to define the relative position between the at least one fitting or removal tool and the rim contour. That means neither the coordinates of the photographed elements nor the distance of the elements to the vision system is detected, but the computer detects the relative position of the photographed elements to each other. That means it detects e.g. if the at least one fitting or removal tool engages the rim contour or is positioned away from the rim contour. The computer does not detect how far the at least one fitting or removal tool are positioned away from the rim contour. The created images are in particular two-dimensional images and an image interpretation is conducted which is explained hereinafter. After creating an image, a command to move the at least one fitting or removal tool is sent to approach the at least one fitting or removal tool to the rim contour. Afterwards, the vision system creates further images of the wheel surface and the at least one fitting or removal tool. The commands sent to the at least one fitting or removal tool are correlated with the signals (i.e. digital images) received from the vision system by the computer. Thereby, the computer compares the initial signals of the vision system with the signals of the vision system after movement of the at least one fitting or removal tool and respects the command sent to the at least one fitting or removal tool. The command which is necessary to approach the at least one fitting or removal tool to the rim contour can be detected in this way. Especially, the method is repeated as long as the at least one fitting or removal tool lies in the desired position relative to the rim contour. Advantageously, according to the invention, the at least one fitting or removal tool can be reliably approached to the rim contour in the tyre fitting and removal operation, when the motor vehicle wheel is rotated about the wheel axis through at least 360°. In particular, the invention is an alternative to the method and the apparatus using sensing devices which detect sensed points in a three-dimensional manner and detect the coordinates by using triangulation as it is shown in EP 1 927 484.

According to an embodiment, the signals of the vision system are sent to the computer and commands to the at least one fitting or removal tool are sent from the computer. That means only one computer is provided performing the mentioned functions which saves costs.

Alternatively, signals of the vision system are sent to a second computer, the second computer is connected with a computer, commands to the at least one fitting or removal tool are sent from the computer. That means there are provided two computers being connected with each other.

Preferably, a plurality of images are created during the mounting or demounting operation by the vision system (e.g. every 40 ms to 100 ms) to reliably detect the position of the photographed elements and the at least one fitting or removal tool.

Furthermore, the invention relates to an apparatus for mounting a tyre on a rim to form a motor vehicle wheel and demounting a tyre from a rim, comprising at least one fitting or removal tool for mounting and demounting the tyre, a computer being able to send commands for the movement of the at least one fitting or removal tool, a vision system for creating images of the wheel or the rim, wherein the vision system is connected with the computer, signals corresponding to the created images being sent to the computer, wherein the computer correlates the signals of the vision system and the commands sent to the at least one fitting or removal tool to define the position of the at least one fitting or removal tool relative to the rim contour and to guide the at least one fitting or removal tool in dependence on the performed correlation without contacting the rim surface. With respect to the advantages it is referred to the above mentioned explanations.

In particular, the vision system creates two-dimensional images. Such a two-dimensional image is composed of an array of image pixels. A two-dimensional image gives information about two dimensions (X and Y) of the elements, but does not provide information about a third dimension (Z value).

The vision system preferably comprises at least one camera for creating images, in particular three cameras are provided. The cameras are directed to the area in which the wheel is positioned and the at least one fitting or removal tool operates and create digital images of the wheel surface and the at least one fitting or removal tool. Furthermore, the cameras may be directed to an area in which an operator acts. Thus, a situation can be detected in which the operator is in danger and the fitting or removal operator is stopped. Furthermore, collisions between the fitting or removal tools and the wheel, rim and/or tyre or between various tools (i.e. fitting or removal tool and hold-down device) can be avoided.

In particular, the vision system is uncalibrated. The positions of the cameras of the vision system to each other are not known and will not be determined. Furthermore, the distance of the photographed elements to the vision system or to a reference point will not be detected. That means that the computer does not detect the coordinates of the photographed elements, but the computer detects the relative position of the elements to each other.

An actuator device can be provided operating the at least one fitting or removal tool.

A sensor device is preferably connected with the computer providing the position of the at least one fitting or removal tool. The sensor device comprises for example sensors, transducers, encoders and/or potentiometers.

According to a first embodiment, the vision system is connected with the computer and the computer is connected with the at least one fitting or removal tool, i.d. only one computer is provided performing the mentioned functions which saves costs.

According to a second embodiment, a second computer is provided, the second computer is connected with the vision system and with the computer, commands to the at least one fitting or removal tool are sent from the computer. That means there are provided two computers being connected with each other.

BRIEF DESCRIPTION OF DRAWINGS

The invention will be described in greater detail hereinafter by means of embodiments by way of example with reference to the Figures in which.

DETAILED DESCRIPTION

Figure 1:
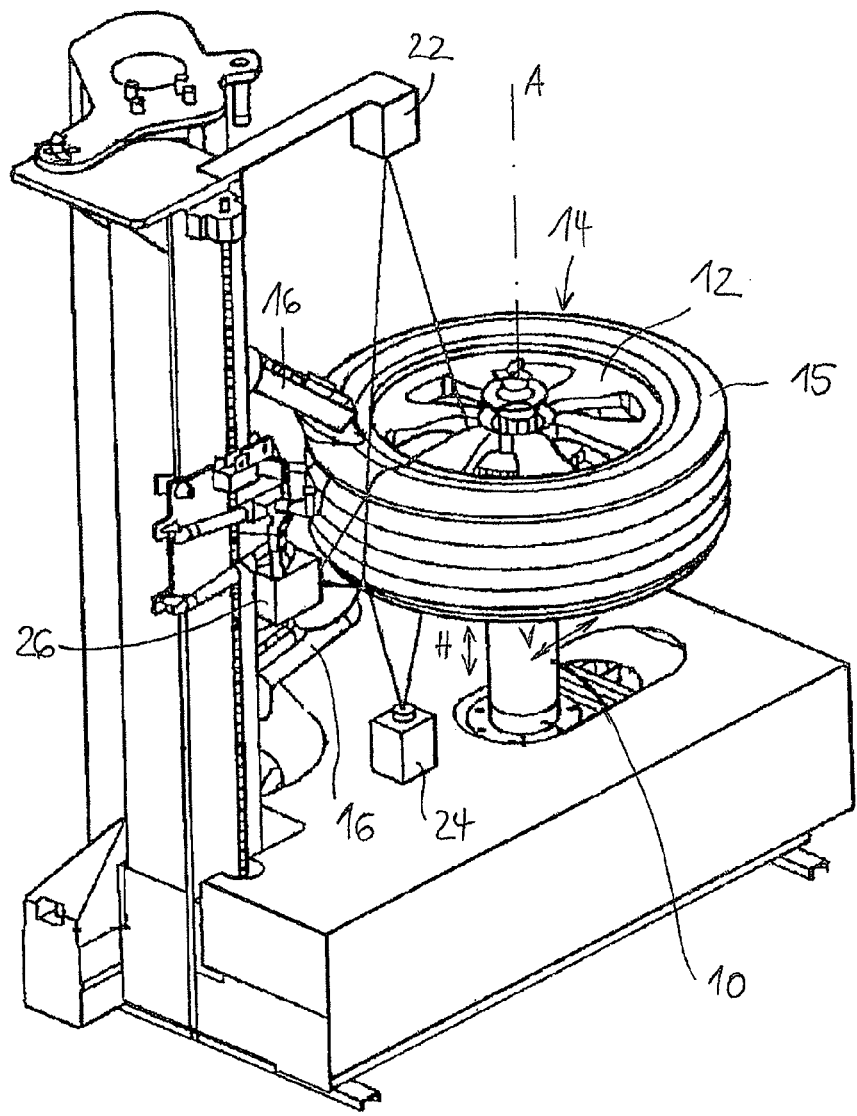
FIG. 1 shows an apparatus according to the invention.

The illustrated embodiments show a tyre changer with a receiving means 10 which is movably in a horizontal direction (as shown with arrow H) and in a vertical direction (as shown with arrow V) and to which a rim 12 of a motor vehicle wheel 14 can be fixed. The motor vehicle wheel 14 further comprises a tyre 15. The receiving means 10 can have a receiving bar, a wheel plate on which the rim 12 is placed, or clamping arms on which the rim 12 is supported, or another support arrangement. The rim 12 is non-rotatably connected to the receiving means 10 by fixing means, in particular clamping means. The receiving means 10 is caused to rotate by means of a rotary drive device (not shown) which can be in the form of an electric motor.

The illustrated embodiment also includes at least one fitting or removal tool 16 which, when the motor vehicle wheel 14 is arranged horizontally, are caused to come into contact with side walls of the tyre 15 from below and from above in the proximity of tyre beads which, when the motor vehicle tyre 15 is in the fitted condition, lie behind two lateral rim beads of the rim 12.

Figure 2:
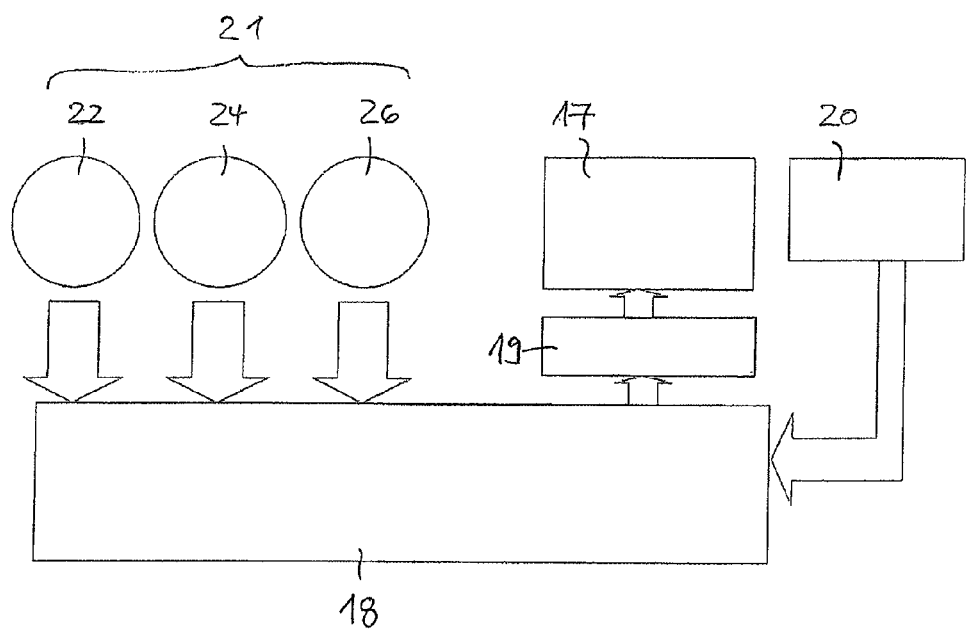
FIG. 2 shows a block function diagram of the apparatus shown in FIG. 1 according to a first embodiment.
Figure 3:
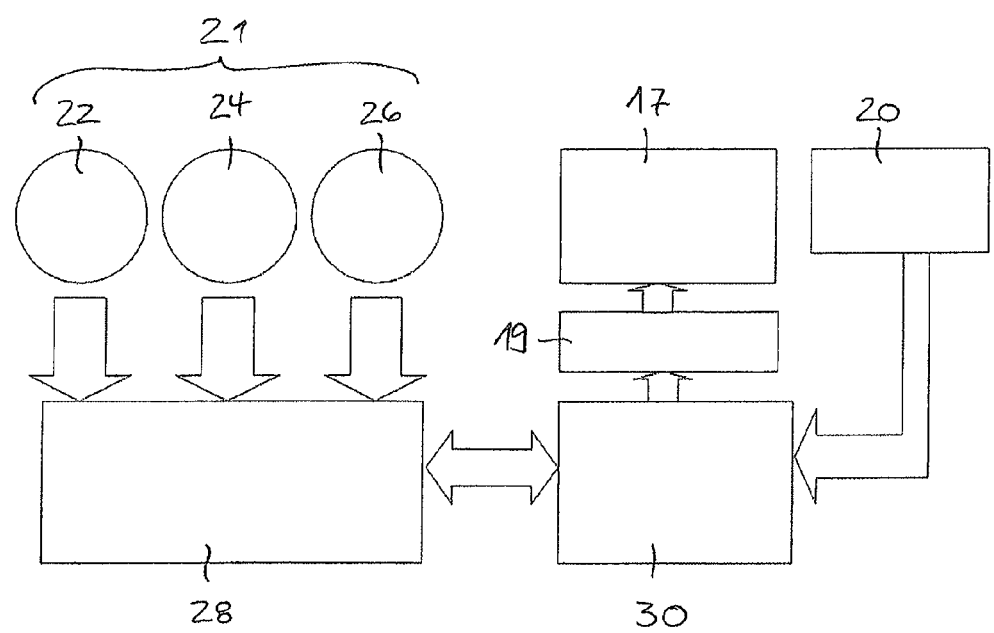
FIG. 3 shows a block function diagram of the apparatus shown in FIG. 1 according to a second embodiment.

The fitting or removal tools 16 can be operated by an actuator device 17. According to a first embodiment of the invention which is shown in FIG. 2, the actuator device 17 is connected with a computer 18, the computer 18 being send commands to the actuator device 17 to change the position of the fitting or removal tools 16. The commands are send via an interface (driver circuit) 19 positioned between the actuator device 17 and the computer 18. The computer 18 is further connected with a sensor device 20 comprising for example sensors, transducers, encoders and/or potentiometers and providing the position of the fitting or removal tools 16.

At both sides of the rim or of the wheel 14 (that means in the illustrated embodiment at the top side of the rim 12 or of the wheel 14 and at the underside of the rim 12 or of the wheel 14) cameras 22 and 24 are positioned. A further camera 26 is disposed on a support movable in a vertical direction and is oriented substantially in a horizontal direction. The cameras 22, 24, 26 are part of a vision system 21 and can be pivotably.

The cameras 22, 24, 26 create images, in particular digital images, of the field of view. As the cameras 22, 24, 26 are directed towards the region in which the wheel 14 is positioned, the fitting or removal tools 16 operate and an operator acts, images of the rim beads at the radial outer surface of the rim 12 and essentially of the rim contour in the region of the rim beads can be produced. The cameras 22, 24, 26 are not calibrated, i.e. no coordinate system is set and the position of the cameras 22, 24, 26 to each other and the coordinates of the photographed points of the wheel surface are not known. That means the "real-world" coordinates, distances or positions are not measured. The created images are two-dimensional, i.e. the distance of the photographed elements are not detected.

The vision system 21, i.d. the cameras 22, 24, 26, are connected to the computer 18 to which the actuator device 17 for the fitting or removal tools 16 and the sensor device 20 are also connected. The cameras 22, 24, 26 can send electrical signals to the computer 18 which represent created images.

In order to remove a tyre 15 with the fitting or removal tools 16, the fitting or removal tools 16 are guided along the rim contour without contacting the rim contour. For this purpose, the cameras 22, 24, 26, which are directed to the area in which the wheel 14 is positioned and the fitting or removal tools 16 operate, create digital images of the wheel surface and the fitting or removal tools 16. Corresponding signals were sent to the computer 18. As the cameras 22, 24, 26 are not calibrated, the computer 18 does not detect the coordinates of the photographed elements. But the computer 18 detects the relative position of the elements to each other. That means it detects e.g. if the fitting or removal tools 16 engage the rim contour or are positioned away from the rim contour, but it does not detect how far the fitting or removal tools are positioned away from the rim contour. The computer 18 sends a command to the actuator device 17 to approach the fitting or removal tools 16 to the rim contour, the sensor device 20 providing the actual position of the fitting or removal tools 16. Such a command reads e.g. as follows: "Move the fitting or removal tools X cm to the left". Afterwards, the cameras 22, 24, 26 create further images of the wheel surface and the fitting or removal tools 16. Corresponding signals were sent to the computer 18. The computer 18 correlates the commands sent to the actuator device 17 with the signals (i.e. digital images) received from the cameras 22, 24, 26, that means the computer 18 conducts an image interpretation. Thereby, it compares the initial signals of the cameras 22, 24, 26 with the signals of the cameras 22, 24, 26 after movement of the fitting or removal tools 16, respects the command sent to the actuator device 17 and determines the command which is necessary to approach the fitting or removal tools 16 to the rim contour. The method is repeated as long as the fitting or removal tools 16 lies in the desired position relative to the rim contour. The cameras 22, 24, 26 create a plurality of images (e.g. every 40 ms to 100 ms) during the operation. Thus, in the tyre removal operation, when the motor vehicle wheel is rotated about the wheel axis through at least 360° the fitting or removal tools 16 can be approached to the rim contour.

Furthermore, with the cameras 22, 24, 26, an operator can be discovered and corresponding signals can be sent to the computer 18. After correlation of several signals, a dangerous situation for the operator can be detected and the method can be stopped. The method and apparatus according to the invention can be used to avoid collisions between the fitting or removal tools and the wheel, rim and/or tyre, between various tools (i.e. fitting or removal tool and hold-down device). Further, the method and apparatus according to the invention allows stopping the method in case of potential damage for the wheel, the tyre and/or the operator.

The first embodiment of the invention showing in FIG. 2 differs from the second embodiment in that there are provided two computers, namely a first computer 28 and a second computer 30. The first and the second computer 28, 30 are connected with each other. The first computer 28 is also connected with the cameras 22, 24, 26. The signals of the cameras 22, 24, 26 are sent to the first computer 28 and afterwards to the second computer 30. The actuator device 17 and the sensor device 20 are connected with the second computer 30. The other components of the apparatus according to the second embodiment and the method correspond to the first embodiment to which it is referred herewith.

The invention claimed is:

1. A method for mounting a tyre on a rim to form a motor vehicle wheel and for demounting a tyre from a rim with at least one fitting or removal tool, the method comprising:
creating, via a vision system, first images of the wheel or rim and the at least one fitting or removal tool, and sending corresponding first signals to a computer;
sending, via the computer, a first move command to the at least one fitting or removal tool after creating the first images;
creating, via the vision system, second images of the wheel or rim and the at least one fitting or removal tool after movement of the at least one fitting or removal tool according to the first move command, and sending corresponding second signals to the computer;
determining, based on a correlation of the first and second signals of the vision system and the first move command, a second move command which is necessary to approach a desired position of the at least one fitting or removal tool relative to the rim contour, wherein the correlation comprises detecting positions of the at least one fitting or removal tool and the wheel or rim relative to each other by image interpretation, and, responsive to the first move command, comparing the first and second images represented by the first and second signals of the vision system to determine the second move command; and
guiding the movement of the at least one fitting or removal tool based on the performed correlation of the first and second signals of the vision system and the move command, without contacting the rim surface.

2. The method according to claim 1, further comprising:
sending signals of the vision system to the computer and sending commands to the at least one fitting or removal tool from the computer.

3. The method according to claim 1, wherein:
the computer is divided into a first computer and a second computer which are connected to each other,
the signals of the vision system are sent to the first computer, and
the second computer sends the commands to the at least one fitting or removal tool.

4. The method according to one of the preceding claims 1, 2, and 3, further comprising:
creating a plurality of first and second images by the vision system during the mounting or demounting operation.

5. An apparatus for mounting a tyre on a rim to form a motor vehicle wheel and for demounting a tyre from a rim, comprising:
at least one fitting or removal tool for mounting and demounting the tyre,
a computer configured to send commands to the at least one fitting or removal tool for effecting a movement of the at least one fitting or removal tool,
a vision system for creating first and second images of the wheel or rim and the at least one fitting or removal tool, wherein:
the vision system is adapted to create the first images before the movement of the at least one fitting or removal tool and to create the second images after the movement of the at least one fitting or removal tool,
the vision system is connected with the computer and adapted to send first and second signals corresponding to the created first and second images to the computer,
the computer is adapted to determine, based on a correlation of the first and second signals of the vision system and a first move command, a second move command which is necessary to approach a desired position of the at least one fitting or removal tool relative to the rim contour, wherein the correlation comprises detecting positions of the at least one fitting or removal tool and the wheel or rim relative to each other by image interpretation, and, responsive to the first move command, comparing the first and second images represented by the first and second signals of the vision system to determine the second move command, and the computer is adapted to guide the at least one fitting or removal tool based on the performed correlation of the first and second signals of the vision system and the commands, without contacting the rim surface.

6. The apparatus according to claim 5, wherein vision system is adapted to create two-dimensional images.

7. The apparatus according to claim 5 or claim 6, wherein the vision system comprises at least one camera for creating images.

8. The apparatus according to one of the claims 5 to 6, wherein the vision system is uncalibrated.

9. The apparatus according to one of the claims 5 to 6, further comprising an actuator device for operating the at least one fitting or removal tool.

10. The apparatus according to one of the claims 5 to 6, further comprising a sensor device connected with the computer for providing the position of the at least one fitting or removal tool.

11. The apparatus according to one of the claims 5 to 6, wherein the vision system is connected with the computer and the computer is connected with the at least one fitting or removal tool.

12. The apparatus according to one of the claims 5 to 6, wherein:

- the computer is divided into a first computer and a second computer,
- the first computer is connected with the vision system and with the second computer, and
- the second computer sends commands to the at least one fitting or removal tool.

* * * * *